June 27, 1933.    W. C. HEDGCOCK    1,916,141
TRUCK
Filed Sept. 8, 1931    3 Sheets-Sheet 1
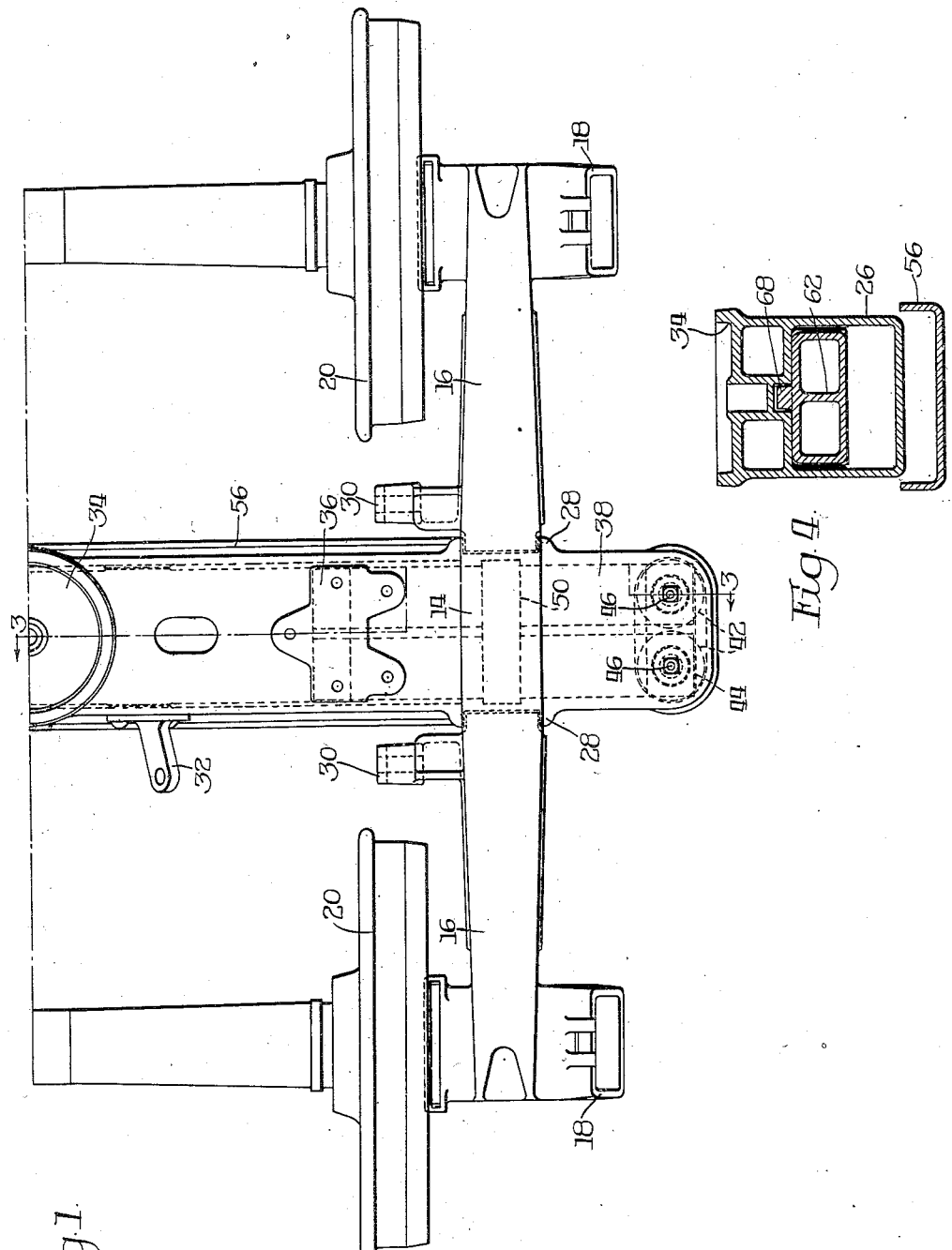
Inventor:
William C. Hedgcock.
By Wilkinson, Huxley, Byron & Knight
Attys June 27, 1933.  W. C. HEDGCOCK  1,916,141
TRUCK
Filed Sept. 8, 1931   3 Sheets-Sheet 2
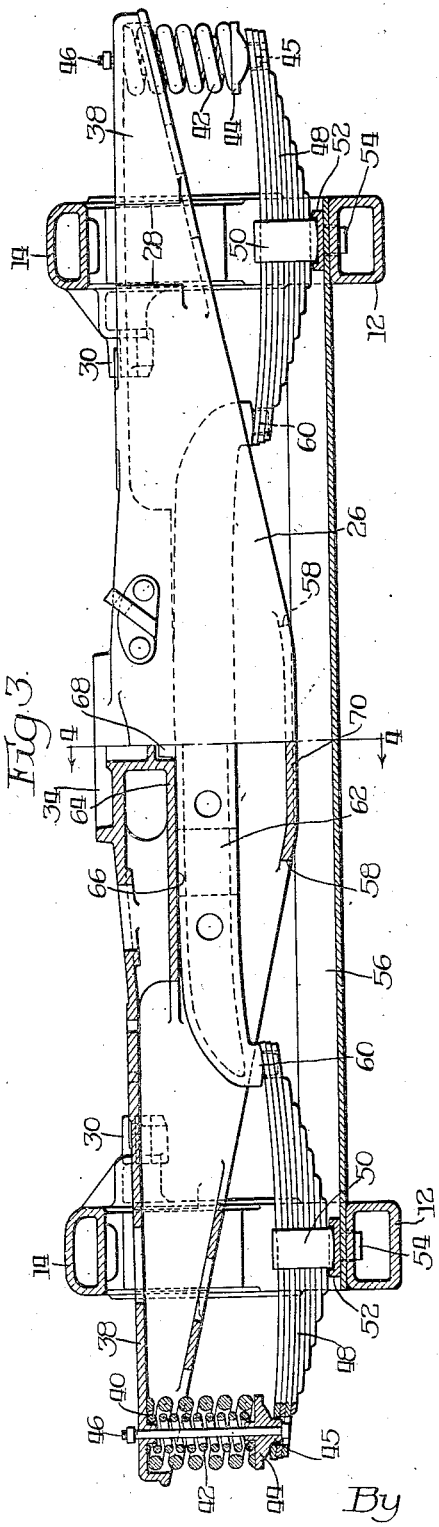
Inventor:
William C. Hedgcock
By Wilkinson Huxley Byron & Knight Attys.

June 27, 1933.      W. C. HEDGCOCK        1,916,141
                        TRUCK
            Filed Sept. 8, 1931      3 Sheets-Sheet 3
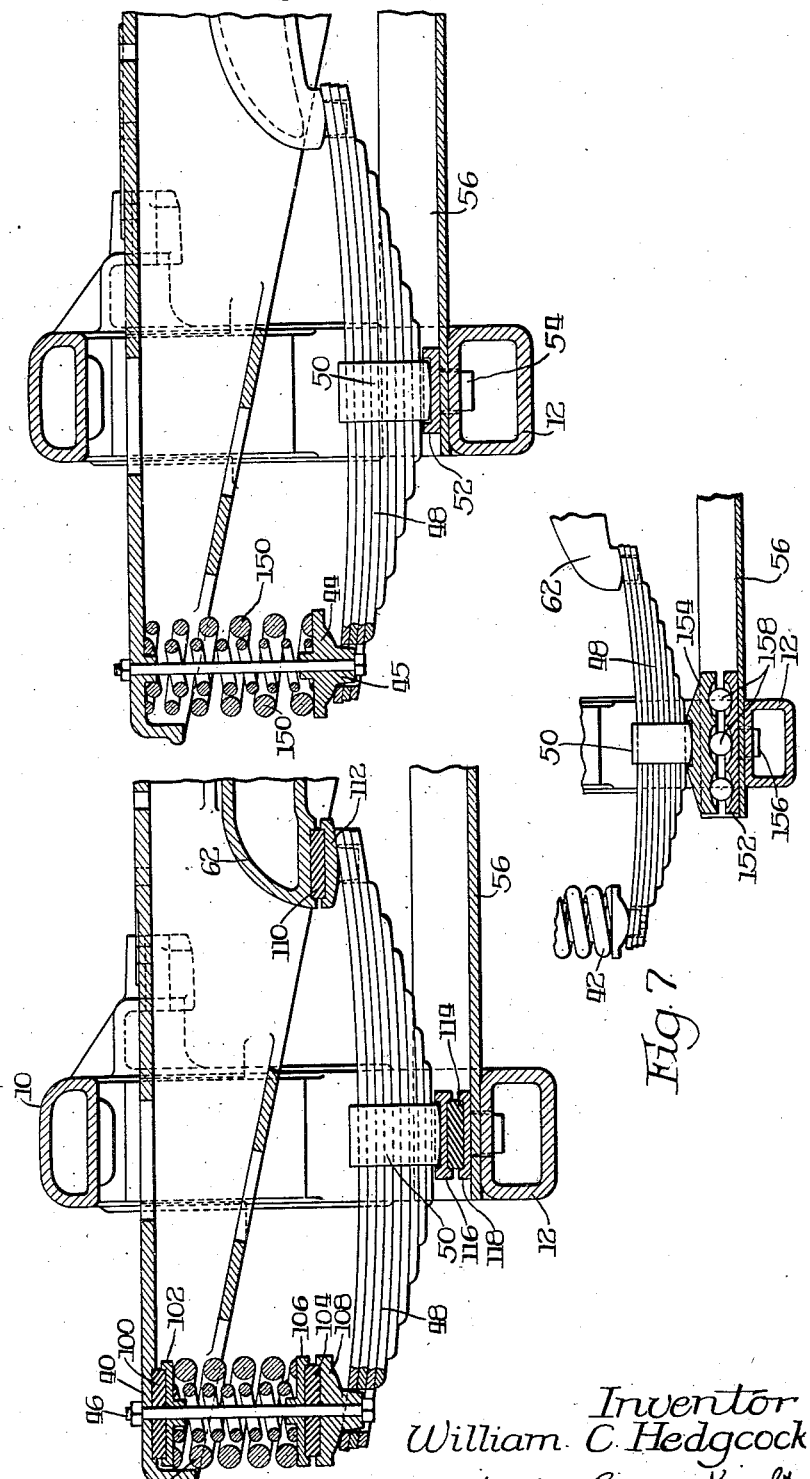

Patented June 27, 1933

1,916,141

UNITED STATES PATENT OFFICE

WILLIAM C. HEDGCOCK, OF WILMETTE, ILLINOIS, ASSIGNOR TO AMERICAN STEEL FOUNDRIES, OF CHICAGO, ILLINOIS, A CORPORATION OF NEW JERSEY

TRUCK

Application filed September 8, 1931. Serial No. 561,531.

This invention pertains to car trucks.

Desirable features for freight car trucks are economy, simplicity, lightness, strength and ease of maintenance, and these features are generally obtained within practical limitations on freight car trucks now in use. However, present freight car trucks are very deficient in easy riding qualities since the spring suspension usually consists only of coil springs which strike a natural period of oscillation or vibration at some operating speed of the car; the resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough, and if sufficient friction is obtained the spring action becomes too stiff and lacks sensitivity.

Passenger car trucks are generally easy riding, due to the use of both coil and elliptic leaf springs in series; the coil springs responding to the light, quick shocks, the leaf springs to the slow, heavy impulses. Coil springs are quick and sensitive in response, leaf springs relatively less so, partly due to frictional work absorption between the leaves. For this reason, and also by providing coil and leaf springs of different natural vibration periods, they tend to damper each others synchronous vibration without impairing free spring response. This condition is obtained by having the different springs in series. Placing leaf and coil springs in parallel is not sufficient, since they then act as a unit and have a common period of vibration.

Although the usual passenger car truck with series arrangement of coil and leaf springs gives good riding qualities, it is undesirably heavy, costly and complicated for freight service. This is partly due to the complete duplication of carrying capacity in both coil and leaf springs.

It is, therefore, an object of this invention to provide a car truck which provides good riding qualities, and at the same time is economical to make and maintain, is simple and light in construction, and fulfills all requirements of manufacture and service.

Another object of the invention is to provide a car truck wherein the spring suspension is such that springs of different character are placed in series.

Yet another object of the invention is to provide a car truck having springs of different characteristics in series and so disposed that complete duplication of carrying capacity is not required in both types of springs.

A further object of the invention is to provide a car truck having springs of different character which are adapted to work independently of each other, whereby shocks incident to operation are adequately absorbed.

A still further object of the invention is to provide a car truck wherein the springs are arranged so that each dampens out the other's vibration.

A yet further object is to provide a truck construction wherein resilient pads are provided for dampening out metallic vibrations transmitted through the metallic truck parts, and also for the purpose of deadening noise.

Another further object is to provide a truck construction wherein resilient and friction and/or resilient means are disposed in series.

A different object is to provide spring assemblies wherein there is provided softer cushioning action under light loads, while at the same time providing the necessary stiffness and capacity under heavy loads, these features being combined also to provide a construction which reduces any tendency toward synchronous vibration of the springs.

A still different object is to provide a truck having a cross equalization system so arranged as to stabilize the car body against lateral swaying, and to minimize such swaying as occurs.

A yet different object is to provide a truck wherein there is a cross equalization from one side of the truck to the other so as to maintain a more uniform distribution of load on the wheels and the opposite sides of the truck, should swaying of the car body occur. This, therefore, would insure safe operation whereby danger of derailment is minimized by maintenance of more uniform loads on all wheels.

A yet further different object is to provide a truck having good riding qualities and one provided with cross equalization whereby safety in operation is insured, together with simplicity, economy, lightness, strength and ease in manufacture and maintenance.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a top plan view of substantially one-half a truck construction embodying the invention;

Figure 2 is a side elevation of the truck construction shown in Figure 1;

Figure 3 is a transverse fragmentary sectional elevation, the section being taken substantially in the plane as indicated by the line 3—3 of Figure 1;

Figure 4 is a longitudinal sectional elevation taken substantially in the plane as indicated by the line 4—4 of Figure 3, Figures 5 and 6 are fragmentary transverse sectional elevations of the modified form of truck construction embodying the invention; and Figure 7 is a fragmentary sectional elevation through the leaf spring and side frame tension member, showing the application of anti-friction members to the truck.

Referring first of all more particularly to the form of truck illustrated in Figures 1 to 4 inclusive, the side frame 10 is provided with the spaced tension and compression members 12 and 14 merging adjacent ends thereof as at 16 and provided with the journal boxes 18 which may be of integral construction. The journal boxes may be of any type and cooperate with the journal ends of the wheel and axle assembly 20 which may also be of any desired construction. The side frame is provided with the spaced column guides 22 integrally connecting the tension and compression members 12 and 14 as forming a bolster opening 24 through which the bolster 26 extends, the bolster being provided with the spaced guide cooperating members 28 embracing the column guides and having sliding cooperation therewith.

The side frame and the bolster are provided with brake hanger brackets 30 and 32 and the bolster is provided with the center bearing 34 and side bearings 36. The ends 38 of the bolster extending outwardly of the side frames are provided with a spring seat portion 40 supported on the coil spring assembly 42 positioned between the spring seat 40 and the spring seat 44, the spring seat being positioned by means of the dowel 45 and the bolt 46, the spring seat 44 being supported at the outer end of the semi-elliptic leaf spring 48. The leaf spring assembly is provided with the spring band 50 mounted on the seat 52, the seat being provided with a positioning dowel 54 extending through a suitable aperture provided in the tension member 12 between the column guides and an aligned aperture provided in the spring plank 56. The spring plank is mounted to connect the spaced side frames 10, it being seen that the spring seat 52 is mounted substantially on the longitudinal center line of the side frame, but it will be understood that alternately the spring seat can be placed to one side of the longitudianl center line, such as shown in application Serial No. 559,617, filed August 27, 1931, in which case the spring plank will serve as a supporting beam for the spring assembly as well as a tie between the side elements.

The side frame is provided with the enlarged opening 59 below the guiding faces of the columns 22 for clearance with the outer lugs 28 when assembling the bolster and the side frames. The inner end of each leaf spring is positioned on the seat 60 of the equalizer 62 so that the equalizer is supported at opposite ends by the inner ends of the opposed leaf spring assemblies. The equalizer supports the central part of the bolster, the bolster being provided with the equalizer seat 64 which may be of straight construction, the equalizer being provided with the upper seat engaging surface 66 formed on a radius, it being understood, of course, that the shape of the cooperating surfaces may be reversed, the flat surface being provided on the equalizer and the convexly arcuate surface being formed on the bolster. The supporting seat on the bolster for the equalizer is properly braced under the center plate and upper center construction of the bolster so as to suitably carry the load. The equalizer is provided with the centering means 68 fitting a corresponding aperture provided in the bolster so that the equalizer is maintained in the proper position in the bolster.

In the construction shown, the equalizer is partially housed within the bolster, the sides of the equalizer being guided by the inner faces of the side walls of the bolster, the bottom wall or tension member 70 of the bolster at the center joining the side walls of the bolster below the equalizer.

It will thus be seen from this construction that the truck bolster is supported on the side frames by an equalization system comprising the coil springs 42, the leaf springs 40, and the equalizer 62 in combination with the bolster 26. If the equalizer were fulcrumed solely at a point at the center of the bolster, the equalizing system would have little resistance toward stabilizing the swaying car body, since all of the parts of the equalization system would pivot freely with fixed lengths of lever arms, and the loads and reactions would remain substantially the same, even though the car body were inclined at a considerable angle. There would, therefore, be insufficient stabilizing effect or restoring moment to center the car body. This feature is taken care of by the arcuate surface 66 of the equalizer which rocks on the flat surface 64 of the bolster. The radius of the arcuate surface on the equalizer with respect to the flat surface on the bolster is made sufficiently large so that the center of support or fulcrum point between the equalizer and the bolster moves outwardly from the center at a rate faster than the lateral movement of the center of gravity of the car body during rolling action. This, of course, produces a stabilizing effect minimizing the tendency of the car body to roll, tending to center the car body when it does roll, and at the same time maintaining a cross equalization across the truck whereby the wheels of both sides of the truck are kept under load.

In the action of the equalization system it will be appreciated that the equalizing action is independent of spring deflection; in other words, the spring elements of the equalizing system might be replaced by non-resilient means without affecting the equalizing principle. In the construction preferred, however, certain elements of the equalizing system are made resilient by the use of springs for these members, as described heretofore, and at the same time resilient spring supporting means for the car body are thus provided.

In the construction shown in Figure 5, the parts are similar to those already described, and like reference characters are used in this and in Figures 6 and 7 to designate like parts. In Figure 5, however, rubber pads 100 are interposed between the top spring cap 102 and the spring seat 40, and rubber pads 104 are interposed between the spring cap 106 and the leaf spring cooperating cap 108. Rubber pads 110 are interposed between the equalizer 62 and the seat 112, cooperating with the inner end of the leaf spring and rubber pads 114 are interposed between the members 116 and 118 cooperating with the spring clip 50 and the side frame tension member 12.

It will, of course, be understood that the pads may be of any resilient material and may be used singly or in any combination with each other or with any form of coil spring assembly 42, such as a spring of constant cross section, constant pitch or variable pitch, or any section or any spring assembly such as shown and described in application Serial No. 552,153, filed July 21, 1931.

In Figure 6 the coil spring assembly 150 is made up of springs formed from a bar of tapering diameter which will be of substantially uniform pitch, though a spring of variable pitch and constant section may be used, or one of variable pitch and section may also be used. In any case, the spring coils close progressively and provide a coil spring of variable stiffness.

In the construction shown in Figure 7, anti-friction races or caps 152 and 154 are provided, the lower race being provided with positioning dowels 156 extending through the spring plank 56 and tension member 12, anti-friction rollers 158 being disposed between said races. The spring assembly 48 is provided with a band 50 supported on the upper race 154, it being understood that a housing may be provided on the race 154 for receiving said band and guided by wings on the bolster as in case, Serial No. 559,617, filed August 27, 1931. As before described, the ends of the spring 48 cooperate with the equalizer 62 and the coil spring for supporting the bolster and any spring and rubber pads may be used in any combination.

It is to be understood that I do not wish to be limited to the exact embodiment of the device shown, which is merely by way of illustration and not limitation, as various and other forms of the device will, of course, be apparent to those skilled in the art without departing from the spirit of the invention or the scope of the claims.

What is claimed is—

1. In a car truck, the combination with a bolster of an equalizing system arranged transversely of the truck, said equalizing system being supported at two spaced points and supporting said bolster at spaced points, said system including a floating rigid member supported at a plurality of points and supporting said bolster intermediate said points.

2. In a car truck, the combination of spaced side frames and a bolster, and an equalizing system supported on said side frames and supporting said bolster at three points spaced transversely of the truck, said system including a floating rigid member supported at a plurality of points and supporting said bolster intermediate said points.

3. In a car truck, the combination of a bolster and spaced side frames, equalizing members fulcrumed on said side frames and operatively connected to an equalizing member fulcrumed on said bolster, said last named equalizing member engaging said first-named equalizing member.

4. In a car truck, the combination of spaced side frames and a bolster, and an equalizing system disposed transversely of the truck for supporting said bolster on said side frames, said system including a floating rigid member supported at a plurality of points on the side frames, and supporting said bolster between said points.

5. In a car truck, the combination of spaced side frames and a bolster, and an equalizing system disposed transversely of the truck, said equalizing system including springs resiliently connected to said bolster outwardly of said side frames.

6. In a car truck, the combination of a side frame and a bolster, a resilient equalizing member fulcrumed on said side frame, and a second equalizing member fulcrumed on said bolster and connected to said first named equalizing member.

7. In a car truck, the combination of a side frame and a bolster, a spring fulcrumed on said side frame and having spaced connections to said bolster, one of said spaced connections being through an equalizer.

8. In a car truck, the combination of a side frame and a bolster, a spring fulcrumed on said side frame and having spaced connections to said bolster, one of said spaced connections being through an equalizer, another of said spaced connections being through a second spring.

9. In a car truck, the combination of spaced side frames and a bolster, spaced springs fulcrumed on said side frames and connected to said bolster, and an equalizer connecting said springs.

10. In a car truck, the combination of spaced side frames and a bolster, spaced springs fulcrumed on said side frames and connected to said bolster, and an equalizer connecting said springs and fulcrumed on said bolster.

11. In a car truck, the combination of side frames and a bolster, springs supported by said side frames and engaging said bolster, and a member fulcrumed in said bolster and connecting said springs.

12. In a car truck, the combination of spaced side frames and a bolster extending through and between the same, springs supported by said side frame and supporting said bolster, and a member fulcrumed in said bolster and connecting said springs.

13. In a car truck, the combination of a hollow bolster having a center bearing and an equalizing member housed within said bolster and fulcrumed therein below said center bearing and substantially in vertical alignment therewith.

14. In a car truck, the combination of a side frame, a bolster having a plurality of supports, resilient means engaging said bolster and supported on said side frame, and an equalizing member serving as one of said supports and having a variable fulcrum point on said bolster.

15. In a car truck, the combination with side frames, a bolster, an equalizing system arranged transversely of the truck, said equalizing system being resiliently supported directly on said side frames at two spaced points substantially in the plane of said side frames and supporting said bolster at three spaced points, said last named spaced points being direct acting.

16. In a car truck, the combination with side frames, a bolster, an equalizing system arranged transversely of the truck, said equalizing system being supported directly on said side frames at two spaced points substantially in the plane of said side frames and resiliently supporting said bolster at three spaced points, said last-named spaced points being direct acting.

17. In a car truck, the combination with side frames, a bolster, an equalizing system arranged transversely of the truck, said equalizing system being resiliently supported directly on said side frames at two spaced points substantially in the plane of said side frames and resiliently supporting said bolster at three spaced points, said last-named spaced points being direct acting.

18. In a truck, the combination of a side frame including tension and compression members and spaced columns integrally connecting said tension and compression members and forming a bolster opening, a bolster extending through said opening, a leaf spring mounted on said tension member, a coil spring mounted between one end of said leaf spring and said bolster, and an equalizer mounted between the other end of said leaf spring and bolster.

19. In a truck, the combination of a side frame including tension and compression members and spaced columns integrally connecting said tension and compression members and forming a bolster opening, a bolster extending through said opening, a leaf spring mounted on said tension member, a coil spring mounted between an end of said leaf spring outwardly of the side frame, and an equalizer mounted between the other end of said leaf spring and bolster.

20. In a truck, the combination of a side frame including tension and compression members and spaced columns integrally connecting said tension and compression members and forming a bolster opening, a bolster extending through said opening, a leaf spring mounted on said tension member, a coil spring mounted between one end of said leaf spring and said bolster, and an equalizer mounted between the other end of said leaf spring and bolster inwardly of the side frame.

21. In a truck, the combination of a side frame including tension and compression members and spaced columns integrally connecting said tension and compression members and forming a bolster opening, a bolster extending through said opening, a leaf spring mounted on said tension member, a coil spring mounted between an end of said leaf spring outwardly of the side frame, and an equalizer mounted between the other end of said leaf spring and bolster inwardly of the side frame.

22. In a truck, the combination of a side frame including tension and compression members and spaced columns integrally connecting said tension and compression members and forming a bolster opening, a bolster extending through said opening, a leaf spring mounted on said tension member, a coil spring mounted between one end of said leaf spring and said bolster, and an equalizer mounted between the other end of said leaf spring and bolster, said coil spring being tapering.

23. In a truck, the combination of a side frame including tension and compression members and spaced columns integrally connecting said tension and compression members and forming a bolster opening, a bolster extending through said opening, a leaf spring mounted on said tension member, a coil spring mounted between one end of said leaf spring and said bolster, and an equalizer mounted between the other end of said leaf spring and bolster, said coil spring being of variable pitch.

24. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, and an equalizer mounted between a portion of said friction assembly and said bolster.

25. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster outwardly of said side frame, and an equalizer mounted between a portion of said friction assembly and said bolster inwardly of said side frame.

26. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, and an equalizer mounted between a portion of said friction assembly and said bolster, said coil spring and equalizer being mounted on opposite sides of said side frame.

27. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said equalizer and friction assembly.

28. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said equalizer and friction assembly and between said friction assembly and side frame and coil spring.

29. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said equalizer and friction assembly and between said friction assembly and side frame and coil spring.

30. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said equalizer and friction assembly and between said friction assembly and side frame and coil spring and between said coil spring and bolster.

31. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and side frame.

32. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and side frame and coil spring.

33. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and side frame and coil spring and between said coil spring and bolster.

34. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and coil spring.

35. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and coil spring and between said coil spring and bolster.

36. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said coil spring and bolster.

37. In a truck, the combination of a side frame including tension and compression members and spaced columns integrally connecting said tension and compression members and forming a bolster opening, a bolster extending through said opening, a leaf spring mounted on said tension member, a coil spring mounted between one end of said leaf spring and said bolster, and an equalizer mounted between the other end of said leaf spring and bolster, said coil spring being of constant pitch and section.

38. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, and an equalizer mounted between a portion of said friction assembly and said bolster, said coil spring being tapering.

39. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, and an equalizer mounted between a portion of said friction assembly and said bolster, said coil spring being of variable pitch.

40. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, and an equalizer mounted between a portion of said friction assembly and said bolster, said coil spring being of constant pitch and section.

41. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster outwardly of said side frame, and an equalizer mounted between a portion of said friction assembly and said bolster inwardly of said side frame, said coil spring being tapering.

42. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster outwardly of said side frame, and an equalizer mounted between a portion of said friction assembly and said bolster inwardly of said side frame, said coil spring being of variable pitch.

43. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster outwardly of said side frame, and an equalizer mounted between a portion of said friction assembly and said bolster inwardly of said side frame, said coil spring being of constant pitch and section.

44. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, and an equalizer mounted between a portion of said friction assembly and said bolster, said coil spring and equalizer being mounted on opposite sides of said side frame, said coil spring being tapering.

45. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, and an equalizer mounted between a portion of said friction assembly and said bolster, said coil spring and equalizer being mounted on opposite sides of said side frame, said coil spring being of variable pitch.

46. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, and an equalizer mounted between a portion of said friction assembly and said bolster, said coil spring and equalizer being mounted on opposite sides of said side frame, said coil spring being of constant pitch and section.

47. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said equalizer and friction assembly, said coil spring being tapering.

48. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said equalizer and friction assembly, said coil spring being of variable pitch.

49. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said equalizer and friction assembly, said coil spring being of constant pitch and section.

50. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said equalizer and friction assembly and between said friction assembly and side frame and coil spring, said coil spring being tapering.

51. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said equalizer and friction assembly and between said friction assembly and side frame and coil spring, said coil spring being of variable pitch.

52. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said equalizer and friction assembly and between said friction assembly and side frame and coil spring, said coil spring being of constant pitch and section.

53. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said equalizer and friction assembly and between said friction assembly and side frame and coil spring, said coil spring being tapering.

54. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said equalizer and friction assembly and between said friction assembly and side frame and coil spring, said coil spring being of variable pitch.

55. In a truck, the combination of a side frame including tension and compression member and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said equalizer and friction assembly and between said friction assembly and side frame and coil spring, said coil spring being of constant pitch and section.

56. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said equalizer and friction assembly and between said friction assembly and side frame and coil spring and between said coil spring and bolster, said coil spring being tapering.

57. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said equalizer and friction assembly and between said friction assembly and side frame and coil spring and between said coil spring and bolster, said coil spring being of variable pitch.

58. In a truck, the combination of a side frame, including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said equalizer and friction assembly and between said friction assembly and side frame and coil spring and between said coil spring and bolster, said coil spring being of constant pitch and section.

59. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and side frame, said coil spring being tapering.

60. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and side frame, said coil spring being of variable pitch.

61. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and side frame, said coil spring being of constant pitch and section.

62. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and side frame and coil spring, said coil spring being tapering.

63. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and side frame and coil spring, said coil spring being of variable pitch.

64. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and side frame and coil spring, said coil spring being of constant pitch and section.

65. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and side frame and coil spring and between said coil spring and bolster, said coil spring being tapering.

66. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and side frame and coil spring and between said coil spring and bolster, said coil spring being of variable pitch.

67. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and side frame and coil spring and between said coil spring and bolster, said coil spring being of constant pitch and section.

68. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and coil spring, said coil spring being tapering.

69. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and coil spring, said coil spring being of variable pitch.

70. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and coil spring, said coil spring being of constant pitch and section.

71. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and coil spring and between said coil spring and bolster, said coil spring being tapering.

72. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and coil spring and between said coil spring and bolster, said coil spring being of variable pitch.

73. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said friction assembly and coil spring and between said coil spring and bolster, said coil spring being of constant pitch and section.

74. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said coil spring and bolster, said coil spring being tapering.

75. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said coil spring and bolster, said coil spring being of variable pitch.

76. In a truck, the combination of a side frame including tension and compression members and spaced columns integrally connecting said tension and compression members and forming a bolster opening, a bolster extending through said opening, a friction assembly mounted on said tension member, a coil spring mounted between a portion of said friction assembly and said bolster, an equalizer mounted between a portion of said friction assembly and said bolster, and a resilient pad mounted between said coil spring and bolster, said coil spring being of constant pitch and section.

77. In a car truck, a pair of spaced side frames, a transverse member fulcrumed intermediate its end upon each of said side frames, a floating support connecting the inner ends of said members, and a bolster supported upon the outer ends of said members and resting upon said support.

78. In a car truck, a pair of spaced side frames, a transverse member fulcrumed intermediate its ends on each of said side frames, an equalizing member carried by the inner ends of said transverse members, and a bolster supported upon the outer ends of said transverse members and rockably supported upon said equalizer.

79. In a car truck, a pair of spaced side frames, a transverse leaf spring assembly rockably supported intermediate its ends upon each of said side frames, an equalizing member supported by the inner ends of said leaf spring assemblies, and a bolster supported upon the outer ends of said leaf spring assemblies and supported upon said equalizer.

80. In a truck, a pair of spaced side frames, a semi-elliptic leaf spring supported intermediate its ends upon each of said side frames and extending transversely thereof, an equalizer carried by the inner ends of said springs, and a bolster supported upon the outer ends of said springs and rockably supported upon said equalizer.

81. In a car truck, a pair of spaced side frames, equalizing members fulcrumed on said side frames and having spaced supporting points, a floating equalizing member carried by one supporting point of each of said first mentioned equalizing members, and a bolster supported by the other supporting point of said first-mentioned equalizing member and upon said last-mentioned equalizing member.

82. In a car truck, a pair of spaced side frames, a transverse equalizer fulcrumed on each of said side frames, a floating equalizing member supported by the inner ends of said transverse equalizers, and a bolster supported by the outer ends of said transverse equalizers and rockably supported upon said equalizing member.

83. In a car truck, a pair of spaced side frames, a transverse member fulcrumed intermediate its end upon each of said side frames, a floating support connecting the inner ends of said members, and a bolster supported by resilient means and upon the outer ends of said members and resting upon said support.

84. In a car truck, a pair of spaced side frames, a transverse member fulcrumed on each of said side frames, an equalizing member carried by the inner ends of said transverse members, and a bolster supported upon the outer ends of said transverse members and rockably supported upon said equalizing member and resilient means interposed between said bolster and side frames.

85. In a car truck, a pair of spaced side frames, a transverse leaf spring assembly rockably supported intermediate its ends upon each of said side frames, an equalizing member supported by the inner ends of said leaf spring assemblies, and a bolster supported upon the outer ends of said leaf spring assemblies and supported upon said equalizing member and resilient means interposed between said bolster and side frames.

86. In a truck, a pair of spaced side frames, a semi-elliptic leaf spring supported intermediate its ends upon each of said side frames and extending transversely thereof, an equalizer carried by the inner ends of said springs, and a bolster supported upon the outer ends of said springs and rockably supported upon said equalizer and resilient means interposed between said bolster and side frames.

87. In a car truck, a pair of spaced side frames, equalizing members fulcrumed on said side frames and having spaced supporting points, a floating equalizing member carried by one supporting point of each of said first mentioned equalizing members, and a bolster supported by the other supporting point of said first-mentioned equalizing member and upon said last-mentioned equalizing member and resilient means interposed between said bolster and side frames.

88. In a car truck, a pair of spaced side frames, a transverse equalizer fulcrumed on each of said side frames, an equalizing member supported by the inner ends of said transverse equalizers, and a bolster supported by the outer ends of said transverse equalizers and rockably supported upon said equalizing member and resilient means interposed between said bolster and side frames.

89. In a car truck, a pair of spaced side frames, a transverse member fulcrumed intermediate its end upon each of said side frames, a floating support connecting the inner ends of said members, and a bolster supported upon the outer ends of said members and resting upon said support and resilient means interposed between said transverse members and said bolster.

90. In a car truck, a pair of spaced side frames, a transverse member fulcrumed intermediate its end upon each of said side frames, a floating support connecting the inner ends of said members, and a bolster supported upon the outer ends of said members and resting upon said support and resilient means interposed between said transverse members and said bolster and in series with said transverse members.

91. In a car truck, a pair of spaced side frames, a transverse member fulcrumed on each of said side frames, an equalizing member carried by the inner ends of said transverse members, and a bolster supported upon the outer ends of said transverse members and rockably supported upon said equalizer and resilient means interposed between said transverse members and said bolster.

92. In a car truck, a pair of spaced side frames, a transverse member fulcrumed on each of said side frames, an equalizing member carried by the inner ends of said transverse members, and a bolster supported upon the outer ends of said transverse members and rockably supported upon said equalizer and resilient means interposed between said transverse members and said bolster and in series with said transverse members.

93. In a car truck, a pair of spaced side frames, a transverse leaf spring assembly rockably supported intermediate its ends upon each of said side frames, an equalizing member supported by the inner ends of said leaf spring assemblies, and a bolster supported upon the outer ends of said leaf spring assemblies and supported upon said equalizer and resilient means interposed between said bolster and leaf spring assemblies.

94. In a car truck, a pair of spaced side frames, a transverse leaf spring assembly rockably supported intermediate its ends upon each of said side frames, an equalizing member supported by the inner ends of said leaf spring assemblies, and a bolster supported upon the outer ends of said leaf spring assemblies and supported upon said equalizer and resilient means interposed between said bolster and leaf spring assemblies and in series therewith.

95. In a car truck, a pair of spaced side frames, equalizing members fulcrumed on said side frames and having spaced supporting points, another equalizing member carried by one supporting point of each of said first mentioned equalizing members, and a bolster supported by the other supporting point of said first-mentioned equalizing member and upon said last-mentioned equalizing member and resilient means interposed between said bolster and one of said equalizing members.

96. In a car truck, a pair of spaced side frames, equalizing members fulcrumed on said side frames and having spaced supporting points, another equalizing member carried by one supporting point of each of said first-mentioned equalizing members, and a bolster supported by the other supporting point of said first-mentioned equalizing member and upon said last-mentioned equalizing member and resilient means interposed between said bolster and one of said equalizing members and in series therewith.

97. In a car truck, a pair of spaced side frames, equalizing members fulcrumed on said side frames and having spaced supporting points, another equalizing member carried by one supporting point of each of said first-mentioned equalizing members, and a bolster supported by the other supporting point of said first-mentioned equalizing member and upon said last-mentioned equalizing member and resilient means interposed between said bolster and said first-named equalizing members.

98. In a car truck, a pair of spaced side frames, equalizing members fulcrumed on said side frames and having spaced supporting points, another equalizing member carried by one supporting point of each of said first-mentioned equalizing members, and a bolster supported by the other supporting point of said first-mentioned equalizing member and upon said last-mentioned equalizing member and resilient means interposed between said bolster and said first-named equalizing members and in series therewith.

Signed at Chicago, Illinois, this 26th day of August, 1931.

WILLIAM C. HEDGCOCK.